Jan. 31, 1967

B. B. MOHS 3,301,344

MOTOR DRIVEN BICYCLE

Filed April 12, 1965

INVENTOR.
BRUCE BALDWIN MOHS
BY Joseph G. Werner

ATTORNEY

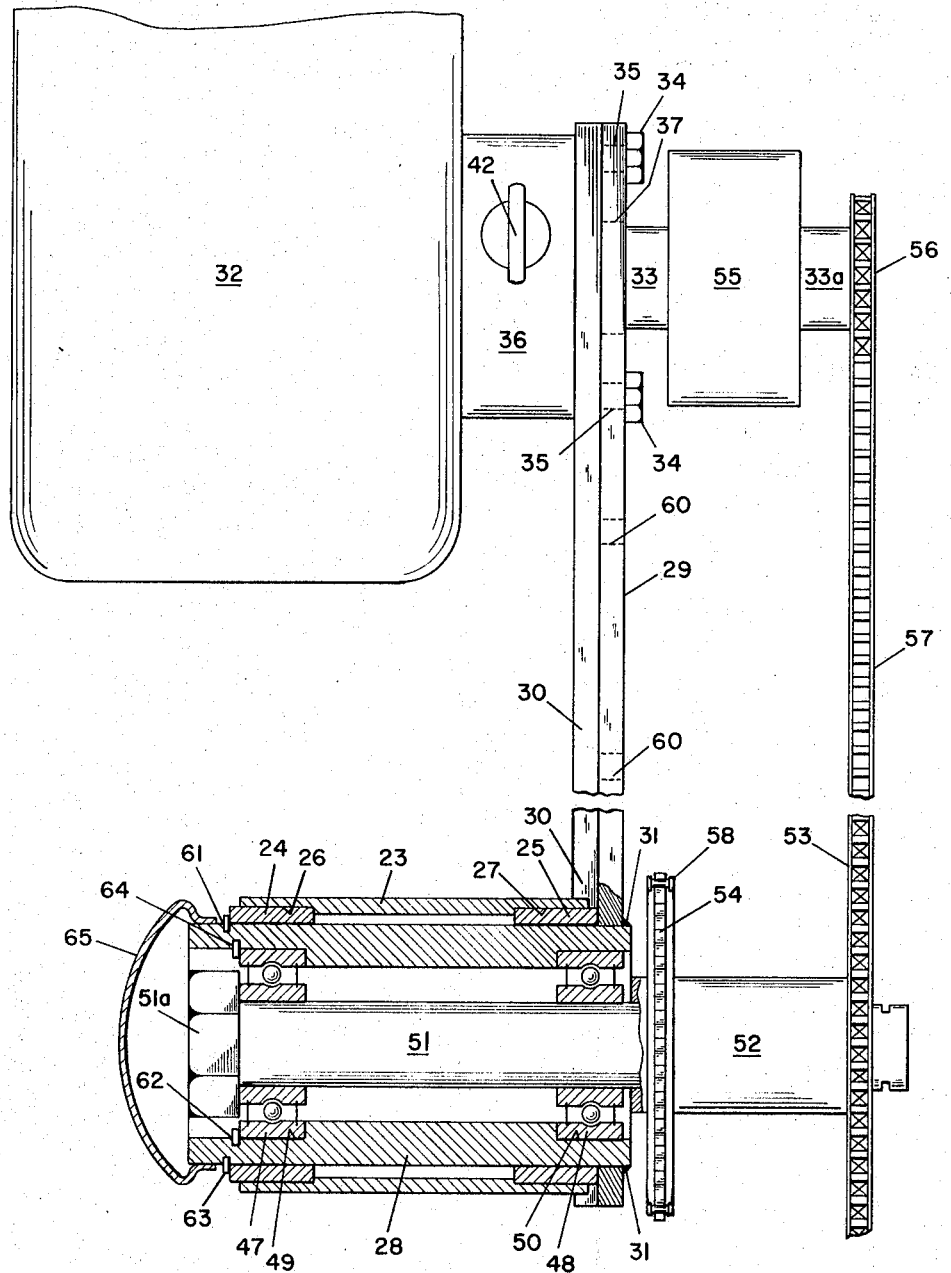

United States Patent Office 3,301,344
Patented Jan. 31, 1967

3,301,344
MOTOR DRIVEN BICYCLE
Bruce Baldwin Mohs, 3525 Lake Mendota Drive,
Madison, Wis. 53705
Filed Apr. 12, 1965, Ser. No. 447,427
3 Claims. (Cl. 180—33)

This invention relates to motor driven bicycles and more particularly to a novel motorized drive mechanism for driving bicycles.

In the past, the drive motors of power driven bicycles have generally been rigidly supported from the tubular frame elements of the bicycles. While attempts have been made to cushion the vibration of the motor from the bicycle frame by placing rubber padding or other cushioning materials between the motor and the motor support, this type of mounting does not adequately protect the bicycle frame elements from such vibration nor does it protect the frame from damaging forces imparted thereto by the weight of the motor when the bicycle traverses a rough roadway or other uneven terrain. Mounting the motor on rubber padding also fails to adequately insulate the motor from damaging jolts.

I have provided a novel drive mechanism which is pivotably mounted at the strongest point of the bicycle frame and which is held between a pair of tubular frame elements of the bicycle by a pair of springs so as to permit the motor to pivot fore and aft with respect to the bicycle frame in response to jolts received by the frame of the bicycle.

My novel drive mechanism is also adapted to be installed on a conventional pedal-type bicycle to convert it to a motor-driven bicycle. As is often the case, when a youngster reaches his middle teens he wishes that his pedal-type bicycle could be replaced by a motor-driven bicycle. The more frugal and industrious of these youths often undertake to convert their pedal-type bicycles to motor-driven bicycles; however, generally the frame of a standard pedal-type bicycle has not been constructed with the idea that it may some day have to withstand the rigors of a motorized drive mechanism. Therefore, in the past efforts to mount motorized drive mechanisms on pedal-type bicycles have proved generally unsatisfactory in that the weight of the motor and the vibration thereof have often caused the frame of the bicycle to be dangerously weakened and to eventually fracture after a period of time.

Accordingly, an object of my invention is to provide a new and improved motor-driven bicycle.

Another object of my invention is to provide a new and improved motorized drive mechanism which is pivotably mounted on the frame of a bicycle.

Another object of my invention is to provide a new and improved motorized drive mechanism which is pivotably mounted in the pedal housing or the like of a bicycle and resiliently secured to the frame of the bicycle for pivotal oscillating movement with respect to the frame.

A still further object of my invention is to provide a new and improved motorized drive mechanism which can be quickly and easily installed in the pedal housing of a standard pedal-type bicycle after the pedal crank has been removed therefrom.

Further objects, features, and advantages of my invention will be apparent from the following detailed description taken in conjunction with the accompanying drawings showing a preferred exemplary embodiment of my invention.

In the drawings:

FIG. 2 is a fragmentary end view of my novel motorized drive mechanism with portions thereof broken away.

Figure 1:
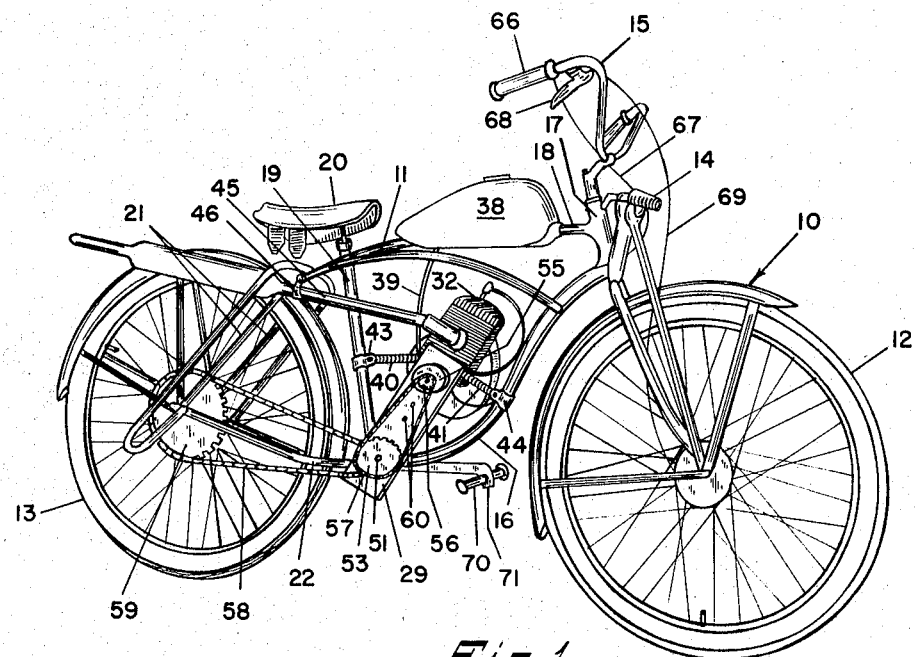
FIG. 1 is a side elevational view of my new and improved drive mechanism for a motor driven bicycle.
Figure 3:
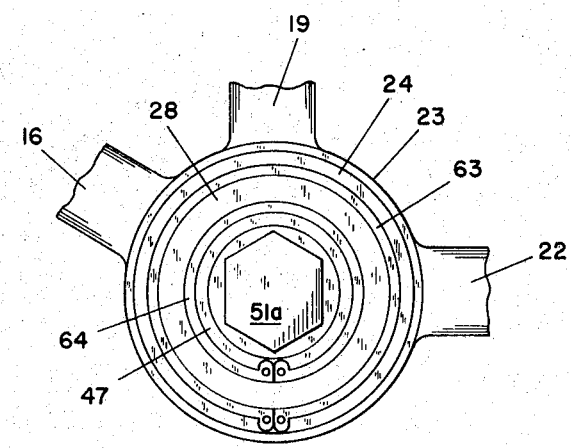
FIG. 3 is a fragmentary view of a portion of my invention taken from the left side of FIG. 2 with the hubcap removed.

Referring now in detail to the drawings, wherein like numerals designate like parts throughout the several views, in FIG. 1 the motor driven bicycle generally designated at 10 has a frame 11 supported on forward and rear wheels 12 and 13, respectively, in the conventional manner. The bicycle has a conventional spring biased front wheel suspension 14 and handle bars 15 for steering the bicycle. The frame 11 has a lower forward tubular frame element 16 rigidly attached at its upper end to the steering column housing 17 and an upper tubular frame element 18 attached to and extending rearwardly from the housing 17. An upstanding tubular frame element 19 supports the bicycle seat 20. The rear end of upper tubular frame element 18 is formed into a bifurcated fork 21 which engages the axle of the rear wheel 13. As best seen in FIGS. 1 and 3, the lower frame element 16, seat supporting element 19 and a lower bifurcated rear frame element 22 are all rigidly attached by welding or brazing to a hollow cylindrical housing 23. On a conventional pedal-type bicycle, housing 23 comprises a pedal housing wherein the pedal crank would ordinarily be journaled. Housing 23 is generally the strongest section of the bicycle frame. The bicycle may be provided with foot rests 70 carried on member 71 secured to the bicycle frame.

Referring now to FIG. 2, the mounting for my novel drive mechanism comprises a pair of metal bushings 24 and 25 mounted in annular grooves 26 and 27, respectively, at the ends of cylindrical housing 23. While any suitable bushings may be employed, bushings 24 and 25 are preferably oil impregnated bronze bushings. A hollow cylindrical hub 28 is rotatably mounted in bushings 24 and 25 and extends outwardly beyond the ends of housing 23. An elongated motor support member 29 has a circular aperture therethrough adapted to receive hub 28. The support member 29 preferably comprises a rigid metal plate with a pair of edge flanges 30 for adding strength to the member. The support member is fixedly secured at its lower end to hub 28 by welding shown at 31 or other suitable means so as to be pivotable with the hub.

A motor 32 having a drive shaft 33 is fixedly secured to the upper end of the support member 29 by suitable means such as bolts 34 which are received in holes 35 in the support member and which are threaded into the motor housing 36. The drive shaft 33 of the motor extends through an aperture 37 in the upper end of support member 29.

The motor 32 is a conventional two-cycle, air cooled engine. It preferably has about 95 cubic centimeters displacement and is about five horsepower. Fuel is supplied to the motor from gas tank 38 via flexible gas line 39 and the speed of the motor is controlled through cable 67 which is controlled by the rotation of handle grip 66. The bicycle is braked in the conventional manner through cable 69 which is controlled by hand operated brake lever 68. The motor 32 is connected to frame elements 16 and 19 by springs 40 and 41, respectively. The springs 40 and 41 are hooked into rings 42 attached to the motor housing 36. As shown in FIG. 1 the other ends of the springs are hooked in brackets 43 and 44 which are attached to the frame elements 19 and 16, respectively.

The springs 40 and 41 should be of such a size that support member 29 is normally inclined forwardly from the cylindrical housing 23 in which it is pivotably mounted so that the motor 32 will be normally carried forwardly of cylindrical housing 23. By having the motor positioned forwardly out of vertical alignment with the housing 23, when the front wheel 12 of the bicycle rides over a bump the ensuing jolt to the frame of the bicycle will not be transmitted directly upward to the motor through the support member 29, but rather the jolt will cause the motor to swing forwardly against the tension of spring 40. The motor is exhausted to the rear by exhaust pipe 45 which is slidably held in collar 46 which is fixedly attached to upper frame element 18.

A pair of ball bearings 47 and 48 are mounted in internal annular grooves 49 and 50 in hub 28. A jack-shaft 51 is journaled in bearings 47 and 48 and has a hex-head 51a at one end. The other end of jack-shaft extends outwardly through the motor support member 29.

A spacer 52 having a pair of sprockets 53 and 54 welded thereto is fixedly secured on the extending end of jack-shaft 51.

Drive shaft 33 of motor 32 has an extension 33a which is adapted to be coupled with and uncoupled from the main portion of the drive shaft 33 by a conventional automatic clutch mechanism such as 55.

The r.p.m. range and power of the motor is such that no pedal assist nor shifting is necessary. Drive shaft extension 33a has a sprocket 56 fixedly attached thereto and a drive chain 57 is trained over sprockets 56 and 53 to impart rotation to sprocket 54 which is mounted in fixed relation with sprocket 53 on jack shaft 51. A second drive chain 58 is trained over sprocket 54 and the rear wheel sprocket 59 for driving the bicycle.

A guard (not shown) may be provided for drive chain 57 and may be secured to motor support member 29 by bolts turned into holes 60 in member 29.

The hub 28 has an external peripheral groove 61 and an internal groove 62 which are adapted to receive external and internal snap rings 63 and 64, respectively. The hub 28 and its associated parts are held in the cylindrical housing 23 by snap ring 63 which bears against bushing 24. The end of hub 28 may be closed by a chrome-plated hubcap 65 which may be frictionally held on hub 28 as shown in FIG. 3.

My novel drive mechanism is resiliently supported between bicycle frame elements 16 and 19 for pivotal movement with hub 28 which is rotatably mounted in hollow cylindrical housing 23 of bicycle 10. This novel arrangement not only insulates the bicycle frame from the vibrations of the motor, but it also protects the frame elements from the shock impact which would otherwise be imparted thereto by the motor, as in rigidly mounted motor systems, when the bicycle negotiates a bumpy roadway or uneven terrain. Furthermore, the motor will be protected from sharp jolts which would otherwise jar and damage the motor.

It is apparent that when the front wheel of the bicycle strikes a bump or drops into a hole in the roadway, the front end of the bicycle will be jolted upwardly or downwardly thereby; however, the impact of this jolt will not be imparted to the motor 32 but will be absorbed by springs 40 and 41 as the motor swings fore and aft between the frame elements 16 and 19 of the bicycle.

Also, the forces which would otherwise be imparted to the frame elements by the weight of the motor are cushioned by the springs, thereby, protecting the bicycle frame against failure.

It is further apparent that the drive mechanism can be very quickly and easily installed or removed from a bicycle. As best shown in FIGS. 2 and 3, the mechanism is held in the hollow cylindical housing 23 by conventional snap ring 63 which is fitted into peripheral groove 61 in hub 28 so as to bear against bushing 24.

It is understood that my invention is not confined to the particular construction or arrangement of parts herein illustrated and described, but embraces all such modified forms thereof, as may come within the scope of the following claims.

I claim:

1. In combination with a bicycle having a hollow cylindrical pedal housing or the like and a frame having first and second frame elements extending from said housing, mechanism for driving the rear wheel of said bicycle comprising:
   (a) a pair of metal bushings mounted in the pedal housing of said bicycle,
   (b) a tubular hub pivotally mounted in said bushings,
   (c) an elongated support member fixedly secured at its lower end to said tubular hub so as to be pivotable therewith between said first and second frame elements,
   (d) a motor fixedly attached to the upper end of said support member, said motor having a drive shaft,
   (e) a pair of springs connecting said motor and said support member to said first and second frame elements,
   (f) a pair of bearings mounted in said tubular hub,
   (g) a jack shaft rotatably mounted in the bearings in said tubular hub and having one end extending therefrom, said one end having a pair of sprockets fixedly mounted thereon,
   (h) a drive chain connecting the drive shaft of said motor to one of said sprockets, and
   (i) a second drive chain connecting the other of said sprockets to the rear wheel of said bicycle.

2. In combination with a bicycle having a hollow cylindrical housing and a frame having first and second frame elements extending from said housing, mechanism for driving the rear wheel of said bicycle comprising:
   (a) a drive motor,
   (b) a pair of bushings mounted in the hollow cylindrical housing of said bicycle,
   (c) a tubular hub pivotably mounted in said bushings, said tubular hub having a peripheral groove adapted to receive an external snap ring for maintaining said tubular hub in the hollow cylindrical housing of said bicycle,
   (d) an elongated support member fixedly secured at its lower end to said hub so as to be pivotable therewith, said motor being fixedly attached to the upper end of said support member between said first and second frame elements, and
   (e) resilient means for maintaining said motor between said first and second frame elements.

3. In combination with a bicycle having a hollow cylindrical pedal housing or the like and a frame having first and second frame elements fixedly secured to said housing, mechanism for driving the rear wheel of said bicycle comprising:
   (a) a support member pivotably secured in the cylindrical housing of said bicycle,
   (b) a motor fixedly secured to the upper portion of said support member between the first and second frame elements of said bicycle, said motor having a drive shaft,
   (c) resilient means for maintaining said motor between said first and second frame elements, and
   (d) means connecting the drive shaft of said motor to the rear wheel of said bicycle, said means comprising a jack shaft journaled in said housing and having one end extending therefrom, said jack shaft having a pair of sprockets thereon, a first drive chain connecting the drive shaft of said motor to one of said sprockets, and a second drive chain connecting the other of said sprockets with the rear wheel of said bicycle.

References Cited by the Examiner

UNITED STATES PATENTS

| 1,780,705 | 11/1930 | Forman | 180—33 |
| 2,538,175 | 1/1951 | Thomas | 180—33 |

FOREIGN PATENTS

| 410,460 | 4/1945 | Italy. |
| 96,405 | 10/1922 | Switzerland. |

KENNETH H. BETTS, *Primary Examiner.*